(No Model.)

A. HALLOWELL.
HYDRAULIC COCK OR FILTERING FAUCET.

No. 298,750. Patented May 20, 1884.

Witnesses
S. N. Piper
E. B. Pratt

Inventor,
Albert Hallowell.
by R. H. Eddy, atty.

UNITED STATES PATENT OFFICE.

ALBERT HALLOWELL, OF LOWELL, MASSACHUSETTS.

HYDRAULIC COCK OR FILTERING-FAUCET.

SPECIFICATION forming part of Letters Patent No. 298,750, dated May 20, 1884.

Application filed December 3, 1883. (No model.)

*To all whom it may concern:*

Be it known that I, ALBERT HALLOWELL, of Lowell, in the county of Middlesex, of the Commonwealth of Massachusetts, have invented a new and useful Improvement in Hydraulic Cocks or Filtering-Faucets; and I do hereby declare the same to be described in the following specification and represented in the accompanying drawings, of which—

Figure 1:
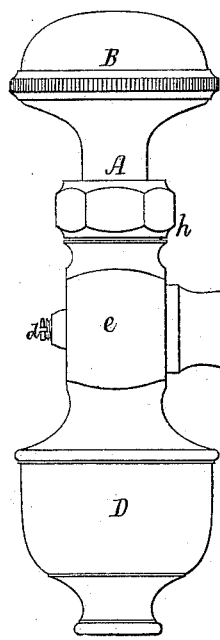
Figure 2:
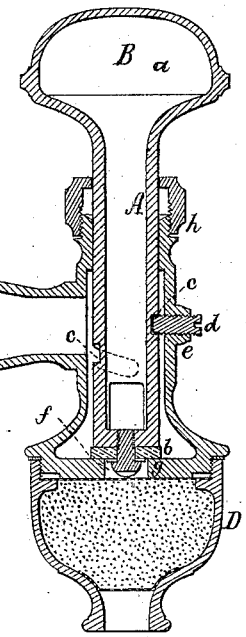
Figure 3:
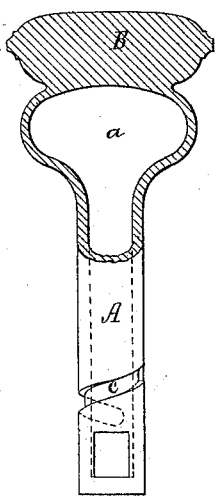

Figure 1 is a side view, and Fig. 2 a longitudinal section, of a filtering-faucet provided with my invention, the nature of which is defined in the claim hereinafter presented. Fig. 3 is a section of the valve-stem and handle, with the air-chamber in the stem.

In the faucet as shown the stem A and its handle or knob B are hollow, or have formed within them an air-chamber, $a$, that opens only out of the stem at its foot or just above its valve $b$. The said stem has within it a spiral groove, $c$, to receive the end portion of a screw, $d$, such screw being screwed into the body or head $e$ of the induct C of the faucet. The stem works in a stuffing-box $h$. The head in this faucet has within it an educt or discharge-opening, $f$, leading from the valve-seat $g$, such head having a filter, D, secured to it. On water under pressure being let into the faucet, or its valve being open, the chamber in the stem and knob of the valve will hold air that will be compressed, and in such state will act as a spring to relieve the cock, and also the filter, as well as the conduit to the faucet, from the sudden strain due to the momentum of the water, particularly on the faucet being closed. The filter will operate to better advantage with the air-chamber in the faucet-stem and its knob than without such.

I would remark that the air-chamber may be in the valve-stem only, or it may be formed both in the stem and handle. In Fig. 3 the stem A is shown as enlarged below the knob B and as having the air-chamber $a$ wholly in the said stem.

I claim—

A hollow faucet provided with a stem interposed between the induct and the educt, such stem being hollow and having an opening into its interior, such opening leading from the interior of the stem into the water-way of the faucet, whereby when the through flow of water is interrupted the latter passes into the stem, and the air therein, having no vent, acts as a cushion, as set forth.

ALBERT HALLOWELL.

Witnesses:
R. H. EADY,
E. B. PRATT.